United States Patent [19]

Panisch

[11] Patent Number: 4,779,344

[45] Date of Patent: Oct. 25, 1988

[54] MANIPULATABLE UTENSIL FIGURE

[76] Inventor: Kate Panisch, 220 E. 63rd St., New York, N.Y. 10021

[21] Appl. No.: 85,708

[22] Filed: Aug. 17, 1987

[51] Int. Cl.⁴ .............................................. A47J 43/28

[52] U.S. Cl. .......................................... 30/326; 30/324

[58] Field of Search .......... 30/147, 149, 150, 324–328; D7/141, 143–146

[56] References Cited

U.S. PATENT DOCUMENTS 4,719,702 1/1988 Hoffman .............................. 30/326

FOREIGN PATENT DOCUMENTS 370541 8/1963 Switzerland .......................... 30/327

327569 4/1930 United Kingdom .................. 30/150

*Primary Examiner*—Douglas D. Watts

*Attorney, Agent, or Firm*—Banner, Birch, McKie & Beckett

[57] ABSTRACT

A manipulatable utensil figure member for a handheld eating or writing utensil. The figure member has a figure face portion, and defines a handle receiving opening for receiving therethrough the handle of the utensil such that the figure member is positioned on the handle and the figure face portion is disposed generally above the handle and generally forward towards the head of the utensil. The figure member has a hand grip portion, which, when the figure member is in the handle received position, is disposed generally below the handle. The figure member further defines a finger receiving channel disposed from a rear surface of the figure member generally forwardly towards the figure face portion. The figure member is adapted and configured so that, when in the handle received position, the user's hand can grasp the hand grip portion with his thumb and at least one of his fingers, and position his index finger in the finger receiving channel. The user can then move his positioned index finger within the figure member so as to expressively manipulate the figure face portion.

34 Claims, 4 Drawing Sheets

MANIPULATABLE UTENSIL FIGURE

BACKGROUND OF THE INVENTION

The present invention relates to the design and construction of handheld utensils, such as eating utensils, including knives, forks, spoons, and the like, and writing utensils or instruments, including pencils, pens, chalk, crayons and the like. It further relates to ornamental designs or figures which can be removably attached or permanently affixed to such handheld utensils.

Many children need encouragement to eat especially foods which they are not fond of which typically can include liver, spinach and the like. Meal times can thereby be troublesome to the parents and not very enjoyable to the children. Additionally, it is desirable to make activities such as drawing, writing and administering medicines more enjoyable to children.

To make such activities more enjoyable to the children (and their parents) many designs or ornamentations adapted to be removably placed on eating utensils or to be integrally formed therewith are known. These include the designs shown in U.S. Pat. Nos. Des. 158,818, 231,721, 257,757, and 274,971, and in U.S. Pat. Nos. 2,787,055, 2,889,624, and 3,968,591, each of whose contents are hereby incorporated by reference in their entirety. At times in years past small generally rigid figures adapted to slide onto spoons and the like and to sit immovable thereon were provided as prizes in cereal boxes. Further, it is known to form the entire handle of the eating utensil in the shape of a object which may be familiar to the child such as the airplane design distributed by Harber, Inc., of Minnetonka, Minn. under the name "Food Flyer", and the small figure extending longitudinally from the end of the eating utensil sold under the name "Special Place Setting" and distributed by Sterling House. While these have some aesthetic appeal to the child they are of limited play or fun value. It is difficult for the child to interact with these figures or if the parent is handling the utensil as when feeding the child or giving him his medicine it is difficult for the parent to interact with the child using these figures.

Accordingly, a primary object of the present invention is to provide a novel construction of a figure adapted for use on a handheld utensil.

Another object of the present invention is to provide an improved construction of a figure attachable to a handheld utensil whose construction allows for the active interaction of the utensil user with the figure.

A further object of the present invention is to provide a novel construction of a utensil figure which allows for the easy adaptation of the design of that figure to resemble a variety of animate and inanimate objects in various positions.

A still further object of the present invention is to provide a novel figure design for a handheld utensil which coincides with the utensil or the use to which it is put in order to increase the fun and/or learning value of the utensil activity.

Another object is to provide a novel construction of a handheld utensil which includes a representation of an inanimate or animate face of an object familiar to the user to thereby entertain him.

A further object is to provide a novel construction for the handle portion of a handheld utensil which is adapted to be grasped in generally the same manner as when the utensil is correctly grasped.

A still further object is to provide a utensil ornamentation which can challenge the imagination of the child user, but does not significantly hinder his manipulation of the utensil.

Another object is to provide a novel utensil figure member which can encourage the advancement of the child user's social and communication skills.

A further object is to provide an attractive eating utensil design which provides a whimsical inducement for the child user to eat, and thereby makes those otherwise difficult mealtime feedings easier.

Other objects and advantages of the present invention will become more apparent to those persons having ordinary skill in the art to which the present invention pertains from the following description taken in conjunction with the accompanying drawings.

DETAILED DESCRIPTION OF THE INVENTION

Figure 1:
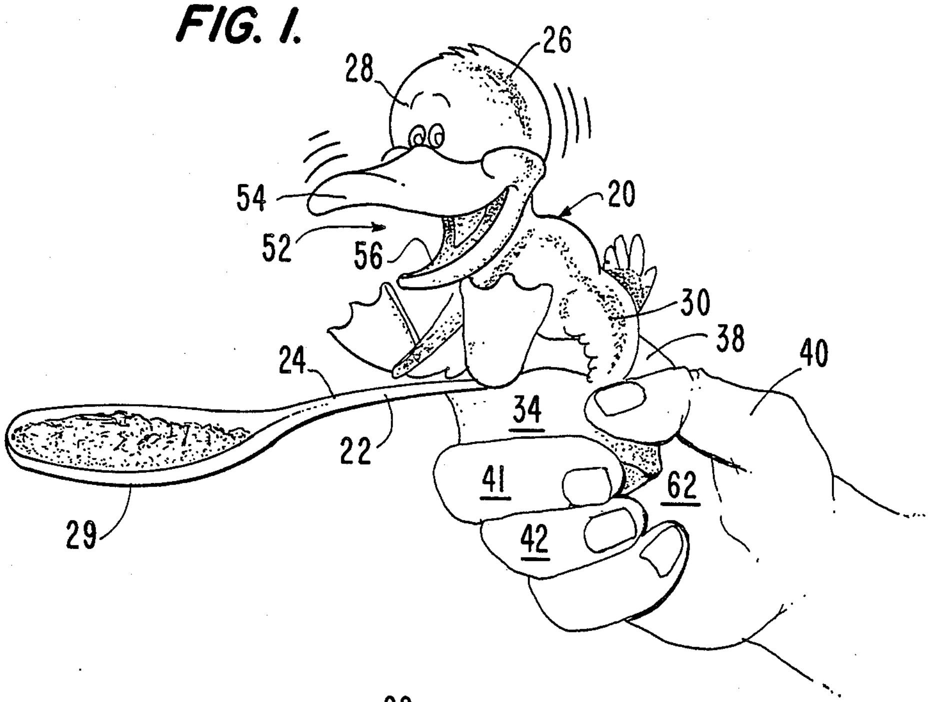
FIG. 1 is a front perspective view of a first embodiment of the present invention shown being held by the user's hand.

Referring to the drawings it is noted that many embodiments of the present invention are possible and the only restrictions thereon on the configurations possible are the limits of the imagination of the designer. It is seen that practically any inanimate or animate object (or representation thereof) can be represented and most of their features can be exaggerated or otherwise animated to make them more appealing, and further they can be configured to be depicted in a variety of different positions relative to the utensil.

Figure 2:
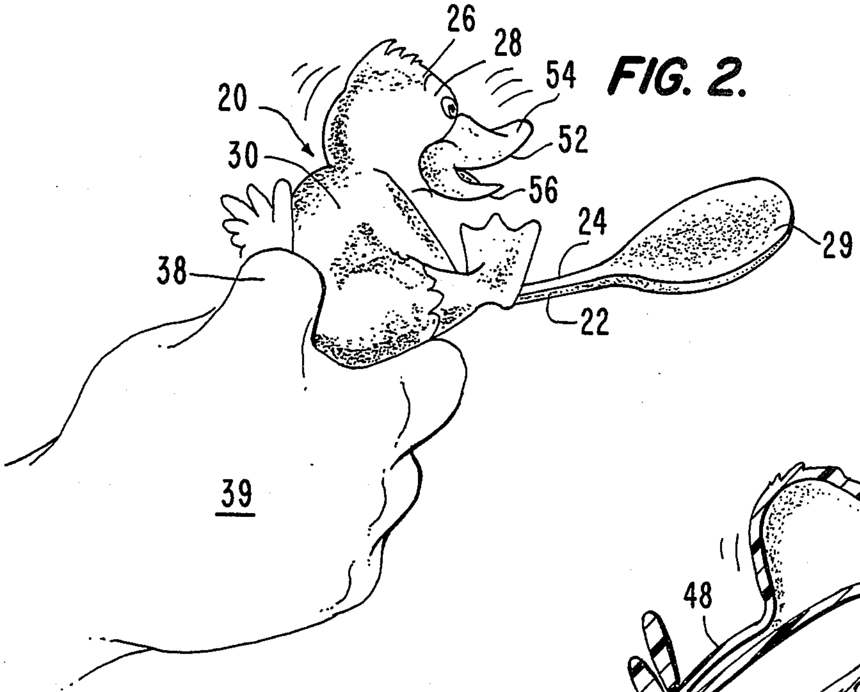
FIG. 2 is a rear perspective view of the first embodiment shown being held by the user's hand.
Figure 3:
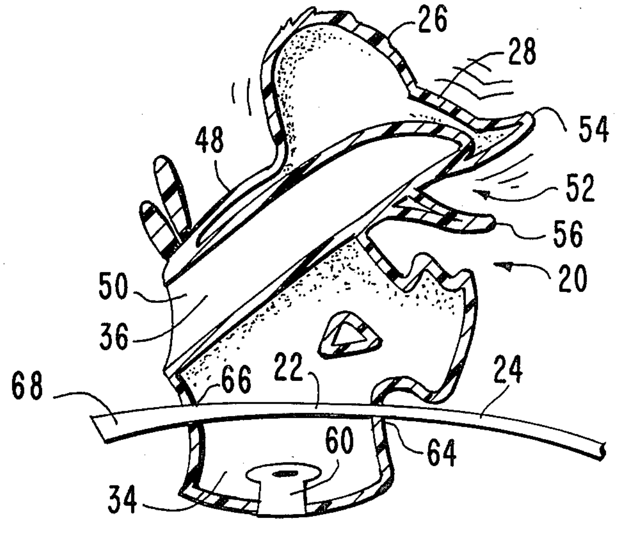
FIG. 3 is a longitudinal cross-sectional view of the first embodiment.

One embodiment of the present invention is illustrated in FIGS. 1–3. Referring thereto it is seen that figure member shown generally at 20 is configured to represent an animated duck who is sitting on the handle 22 of a utensil 24. The figure member 22 includes a forward disposed or extending front or head portion 26 having the face portion 28 thereof generally pointed towards the operative end 29 (spoon bowl, fork prongs, and the like) of the utensil 24 and spaced above the handle 22. The figure's body portion 30 is formed with the head portion 26 and is attachable to the handle 22 of the utensil, as described later. For this particular figure configuration the figure's (duck's) legs 32 which are attached to the body portion 30 extend forward and generally above the handle 22 so that the figure member 20 is depicted as sitting on the handle 22. However, as will later be more apparent, generally any positioning of the figure member 20 relative to the handle 22 is possible. A generally cylindrical hand grip portion 34 is attached to and formed integrally with the body portion 30 so as to extend below the handle 22 as best shown in FIGS. 1 and 3. The figure member 20 defines an index finger receiving channel 36 from the rear surface 38 of the figure member 20, such as the head, back or tail end thereof, forward towards the face portion 28 for receiving the user's index finger 38 of the user's hand 39 therein as further explained below.

Thus, the hand grip portion 34 is adapted so that when the figure member 20 is attached to the handle 22 of the utensil 24 the user can wrap his thumb 40 and middle finger 41 and/or ring finger 42 (see FIG. 1), around the hand grip portion and insert his index or forefinger 38 into the finger receiving channel 36, as pictured in FIGS. 1, 3, 6 and 8. The user's hand 39 will thusly be in a position for manipulating the utensil 24. Also, the end portion of his inserted index finger 38 will be adjacent the inside of the face portion 28 which is formed of a flexible material, as can be appreciated from FIG. 3. Thus, by manipulating or moving the forward tip of his index finger 38 the user can cause the face portion 28 of the figure member 20 to move expressively in a visually perceptible manner relative to the body portion 30 of the figure member 20 as well as to the utensil 24 itself.

One construction of the figure member 20 is to form it of a hollow thin-shelled construction such as is best shown in FIG. 3 at 46. This could be approximately one-sixteenth of an inch thick end formed of a flexible non-toxic material such as latex or polyurethane. The finger receiving channel 36 could then be formed by a sleeve 48 of a flexible material extending from an opening 50 at the end of the rear surface towards the face portion 28. The figure member 20 can alternatively be constructed of a generally solid construction with the finger receiving channel 36 carved or formed therein.

It is also within the scope of the present invention to form the face portion 28 so as to define a mouth 52 having an upper jaw 54 and a lower jaw 56, at least one of which is movable relative to the other. The finger receiving channel 36 can then be disposed so that the index finger 38 inserted therein will move one of the jaws, preferably the upper jaw 54, relative to the other jaw so as to imitate or resemble eating and/or speaking motions. A novel utensil-mountable finger puppet manipulatable by the hand of the user as he holds the utensil 24 is thereby defined.

It is further within the scope of the present invention to provide a squeaker or other similar noise making device 60 supported by the figure member 20. This noise Making device 60 is shown in FIG. 3 as being positioned in the hand grip portion 34 of the figure member 20 so that when the user squeezes the hand grip portion 34, the noise making device 60 can thereby be activated. This device alternatively can be positioned adjacent the finger receiving channel 36 so that it can be activated by the index finger 38 positioned therein. Also, it can be positioned outside or directly inside of the hand grip portion 34 at the rear surface thereof so it can be activated by the palm 62 of the user's hand 39, or at a forward surface thereof to be activated by the user's middle or ring fingers 41, 42. Further, more than one noise making device 60 can be provided for the figure member 20, each to be separately activated. The noise making device 60 can make any entertaining noise, but it is anticipated that a preferred noise would represent the noise which the inanimate or animate object represented by the figure member 20 would make, such as a squeaking noise for a mouse design. Various constructions of the noise making device 60 are known and within the skill of the art and so are not described in detail herein. However, one construction of a noise making device 60 can be a small squeezable bladder having an outlet and a whistle device disposed in the outlet. Then as the bladder is squeezed the air therein is forced out through the whistle device causing a whistling or squeaking noise, and when the bladder is subsequently released the air rushes back into it through the outlet.

One design of the present invention is to provide a channel through the figure member 20 generally above the hand grip portion 34 through which the handle 22 of the utensil 24 is inserted. When the figure member 20 is of a hollow construction, such as shown in FIG. 3, the channel can take the form of two opposed slits 64, 66 through the figure member 20 wherein the slits 64, 66 are properly aligned and configured to receive the handle 22 therein and therethrough. It would be a simple matter then to fit the free end 68 of the handle 22 of the utensil 24 in the forward slit 64 and then slide the figure member 20 relative to the handle 22, in a "slip cover" manner, so that the end of the handle 68 then passes through the back slit 66. The slits 64, 66 can be configured and adapted to receive generally any average size utensil handle 22 therein and are flexible so as to hold the figure head 20 relative to it without the figure head 20 freely rotating about the handle 22. This allows the figure member 20 to be fitted onto a variety of utensils 24 and for the utensil 24 to be separated from the figure member such as for washing the utensil.

Figure 11:
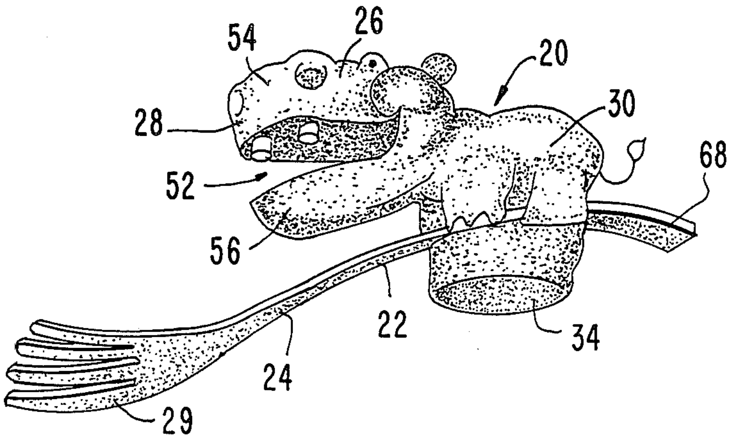
FIG. 11 is a perspective view of a sixth embodiment of the present invention.

An alternative design is to form the figure member 20 so as to be permanently affixed to the utensil 24. And for this design, if it is expected that the utensil, such as a spoon or fork, as shown in FIG. 11, is to be dirtied and then reused then the figure member 20 as well as the utensil 24 should be constructed of a suitable durable washable material and without cracks or crevices in its surface in which particles of food and the like can be caught, so it can be easily and thoroughly cleaned.

Figure 4:
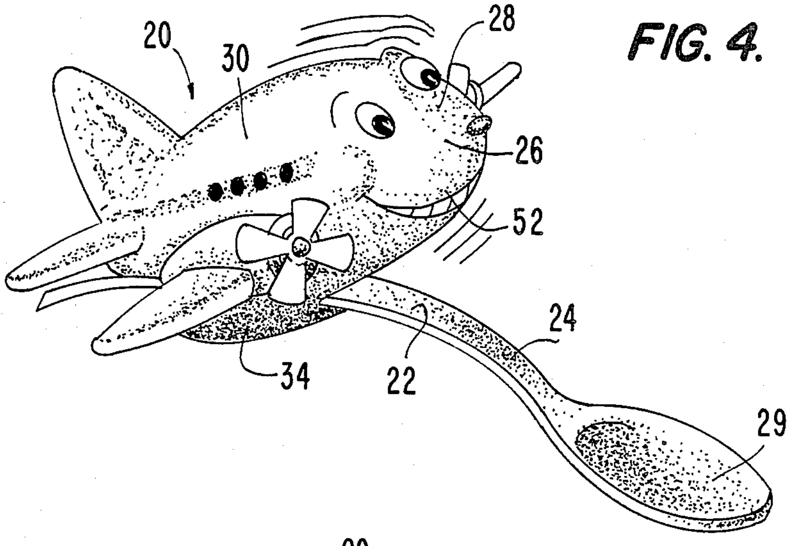
FIG. 4 is a front perspective view of a second embodiment of the present invention.
Figure 5:
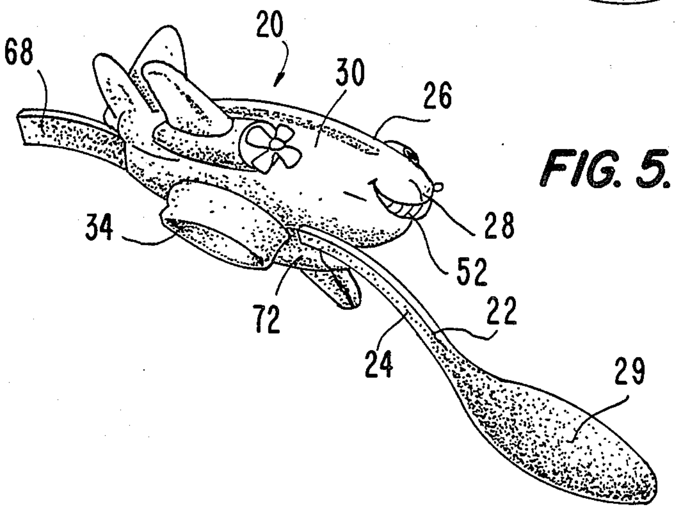
FIG. 5 is a bottom perspective view of the second embodiment.
Figure 6:
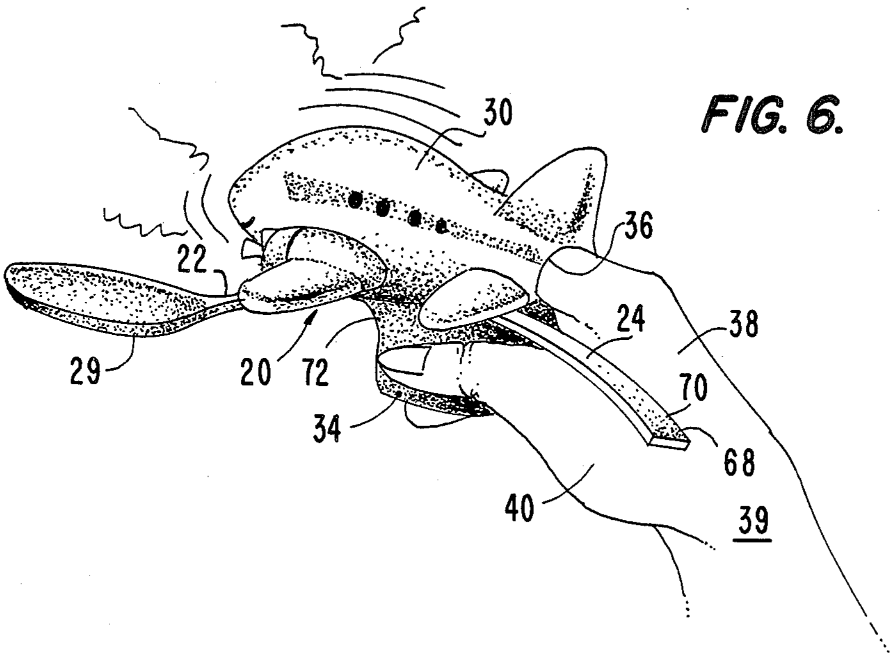
FIG. 6 is a rear perspective view of the second embodiment shown being held and manipulated by the user's hand.

The figure member 20 can be constructed so that the utensil handle 22 extends only part way into it and thus is disposed entirely within it. Alternatively, it can extend a short distance out the back of the figure member 22, as shown in FIG. 3, whereby when the utensil 24 and figure member 20 are grasped by the user's hand 39, the end 68 of the handle 22 will be positioned generally in the palm 62 of the user's hand 39, as best shown in FIG. 2. Another alternative design is to extend the handle end 68 a greater distance out the back of the figure member 20 as shown in FIGS. 4–6. For this configuration, when the user's index finger 38 is inserted into the finger receiving channel 36 and the user's middle and/or ring fingers 41, 42 and thumb 40 are grasping the hand grip portion 34, the handle 24 of the utensil 26 which extends a greater distance out the rear end of the figure member 20 than that of the embodiment of FIG. 3 will extend so as to be positioned on the user's hand 39 in the crease 70 thereof between his index finger 38 and thumb 40. This generally represents the normal hand position for handling a utensil 24, such as a pencil, spoon or fork, and can be instructive to the child in how to properly handle and manipulate the utensil 24. As can be appreciated, when the user's hand 39 is in the utensil manipulating position the operative end 29 of the utensil, such as the prongs of a fork, the bowl of a spoon, or the point of a writing instrument, is easily manipulated by the user even when the user is a young child.

Still referring to FIGS. 4-6 an alternative design of the present invention is illustrated wherein the figure member 20 is configured to depict an airplane having its belly 72 resting on the handle 24 of the utensil 26 when the figure member 20 is fitted on it. Although the airplane configuration is depicted as having a closed mouth 52, the mouth can also be configured to have separable open upper and lower jaws similar to the configuration of FIGS. 1 and 3 so that the upper jaw can be moved relative to the lower jaw, or vice versa.

Figure 7:
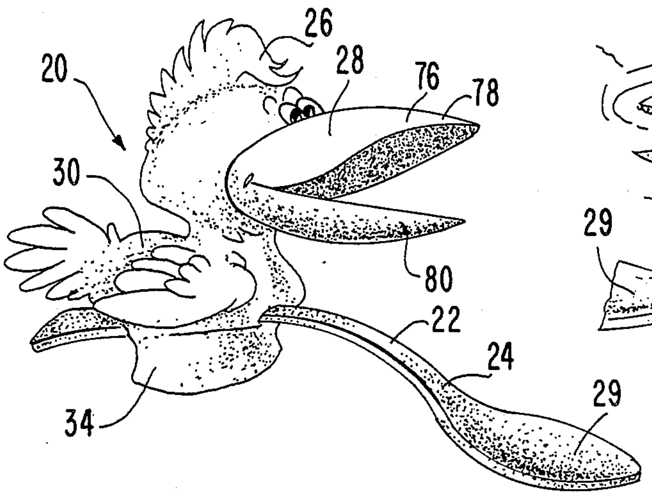
FIG. 7 is a front perspective view of a third embodiment of the present invention.
Figure 8:
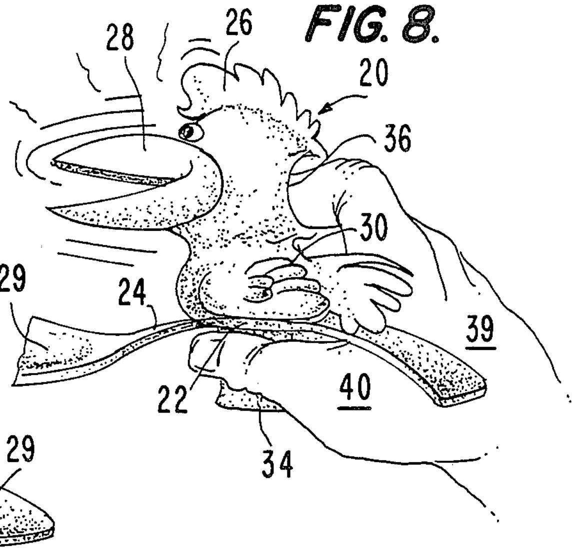
FIG. 8 is a rear perspective view of the third embodiment shown being held and manipulated by the user's hand.

The positioning of the handle 22 wherein it extends a distance behind the figure head 20 so that it is positionable in the crease 70 of the user's hand 39 between his thumb 40 and index finger 36 is also illustrated in the embodiments of FIGS. 7 and 8. It is seen that the figure member 20 thereof is shaped to resemble a bird having an elongated beak 76 with upper and lower beak jaws 78, 80 movable relative to each other, and pictured as sitting on the handle 22 of the utensil 24.

Figure 9:
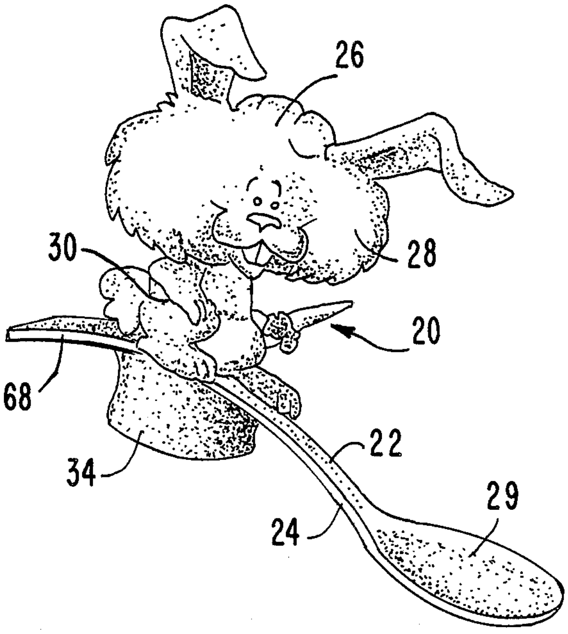
FIG. 9 is a perspective view of a fourth embodiment of the present invention.
Figure 10:
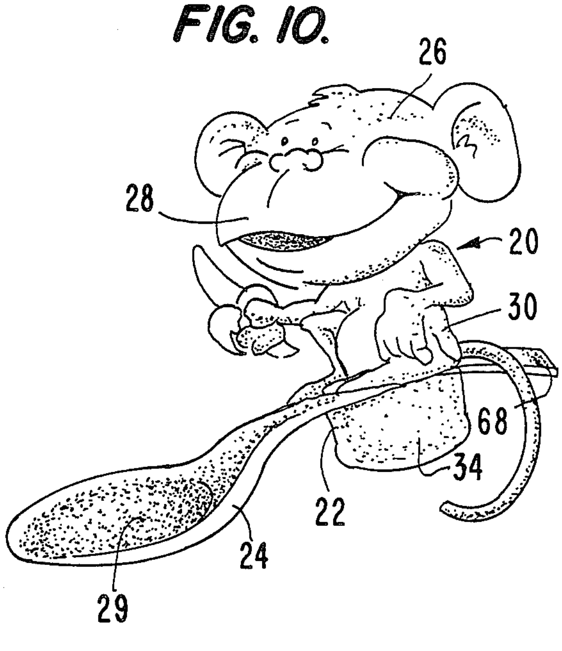
FIG. 10 is a perspective view of a fifth embodiment of the present invention.
Figure 12:
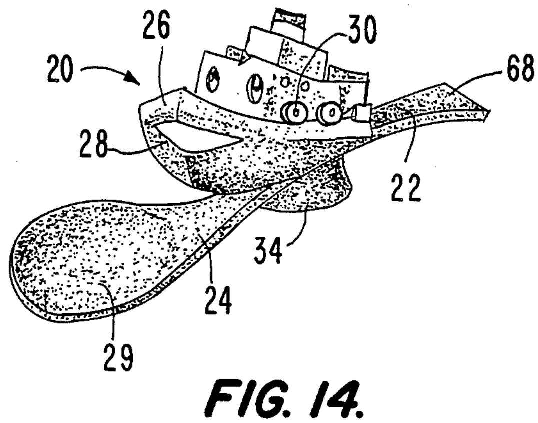
FIG. 12 is a perspective view of a seventh embodiment of the present invention.
Figure 14:
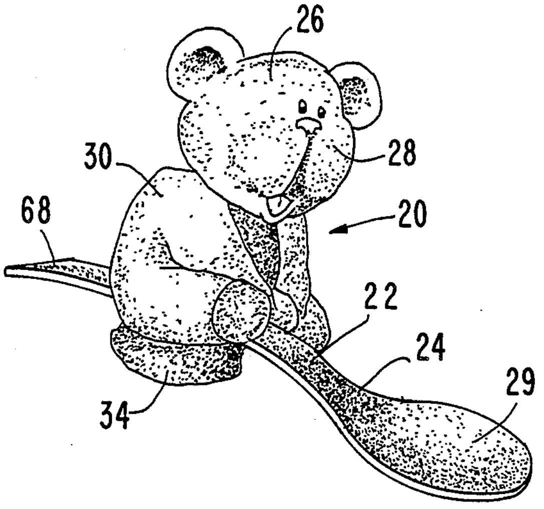
FIG. 14 is a perspective view of a ninth embodiment of the present invention.
Figure 15:
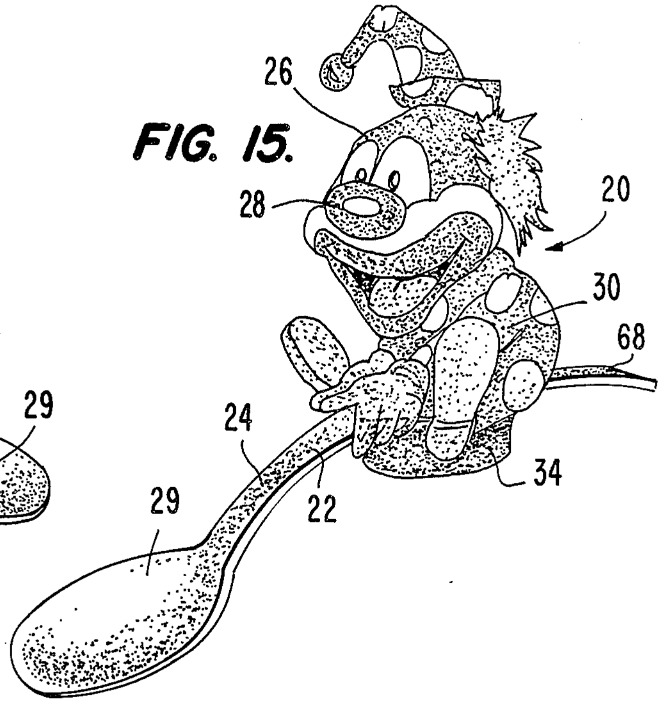
FIG. 15 is a perspective view of a tenth embodiment of the present invention.
Figure 16:
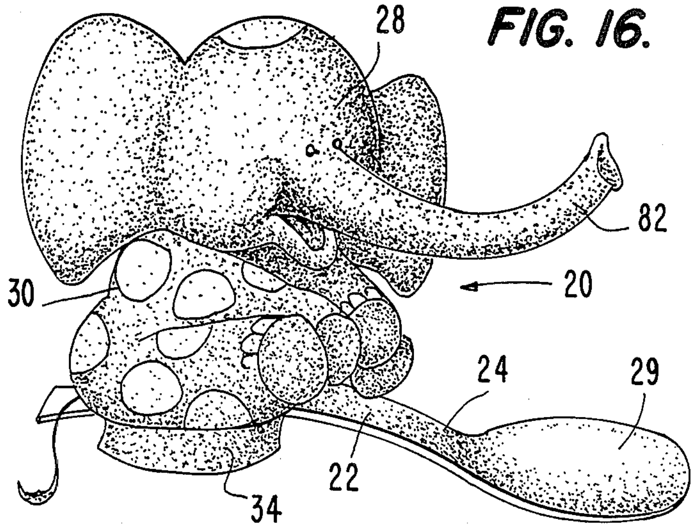
FIG. 16 is a perspective view of an eleventh embodiment of the present invention.

The object represented by the figure member 20 can also be constructed to be depicted as standing on the utensil when the figure member is in the handle received position relative to the tensil, as shown by the rabbit of FIG. 9 and the hippopotamus of FIG. 11. Alternatively, the object can be depicted as sitting on the utensil such as shown by the monkey of FIG. 10, the teddy bear of FIG. 14, the clown of FIG. 15, and the elephant of FIG. 16. Inanimate objects, such as the boat of FIG. 12 and the train of FIG. 13, can be pictured as resting on the utensil handle 22. It is also possible to configure the face portion 28 of the object so as to have a large nose or snout into which the finger receiving channel 36 extends and which can be then moved relative to the rest of the depicted object. This construction is shown for example by the trunk 82 of the elephant of FIG. 16.

Figure 13:
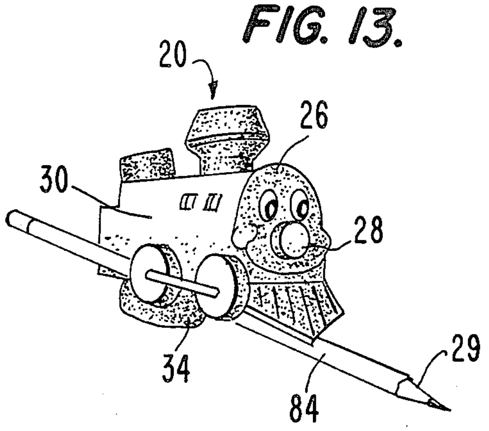
FIG. 13 is a perspective view of an eighth embodiment of the present invention.

Although the handheld utensils 24 illustrated in FIGS. 1–12 and 14–16 are spoons or forks, any other types of handheld instruments or utensils are within the scope of this invention, including without limitation writing instruments such as pencils, as shown in FIG. 13 at 84, crayons, pens, chalk, and paint brushes, and the like.

The different configurations of the figure members 20 and the variations thereof are limited only by the imagination of the designer, and they can for example depict a doctor or nurse for use in giving children their medicine, or can be coincident with the particular utensil with which they are used, such as an animated orange fruit shape when attached to an orange crayon or marking pen. Also, if they are used as promotional items for businesses they can display the company's logo, trademark, or mascot as forming the figure head such as those of a well known commercial clown or kitty. Further, the figure head 20 can be constructed so that the user can grasp it with either his left or right hand 39, or the positioning and orientation of the finger receiving channel 36 can be such that the user can grasp it with only one of his hands. Additionally, although the finger receiving channel 36 in FIG. 3 is shown as angling up and away from the handle 22 of the utensil 24, it can be disposed in a more parallel fashion in certain instances.

As can be appreciated by the variations of the animals, toys, vehicles and the like which are depicted herein and their animated features and with the provision for the manipulation of the face portion 28 to represent an eating or talking motion of the figure member 20 and the activation of the noise making device 60, the figure member 20 can be caused to seem to actually spring to life. This can make the eating, writing or other activity more fun for the child user, and his parents or teachers. Further by encouraging the child's interaction with the figure member 20 his communication and social skills can be thereby advanced.

From the foregoing detailed description, it will be evident that there are a number of changes, adaptations and modifications of the present invention which come within the province of those skilled in the art. However, it is intended that all such variations not departing from the spirit of this invention be considered as within the scope thereof as limited solely by the claims appended hereto.

What is claimed is:

1. For a handheld utensil, such as an eating or writing utensil, including an elongated utensil handle having a first handle end and a second handle end and a utensil head attached generally to the second handle end, a manipulatable utensil figure comprising:

a figure member having a figure face portion, said figure member defining a handle receiving opening for receiving the handle therethrough in a handle received position such that said figure member is positioned on the handle and said figure face portion is disposed generally above the handle and generally forward towards the utensil head, said figure member having a hand grip portion, said hand grip portion, when said figure member is in said handle received position, being disposed generally below the handle, said figure member defining a finger receiving channel disposed from a rear surface of said figure member generally forwardly towards said figure face portion, and said figure member being adapted and configured so that, when in said handle received position, the user's hand can grasp said hand grip portion with his thumb and at least one of his fingers, and with his index finger positioned in said finger receiving channel, whereby the user's hand is in a utensil manipulating position, and the user can move his positioned index finger within said figure member so as to manipulate said figure face portion relative to the handle to an extent which is readily visually perceptible.

2. The manipulatable utensil figure of claim 1 including, said figure member being configured so that, when in said handle received position, the rear end thereof is spaced from the first handle end.

3. The manipulatable utensil figure of claim 2 including, said figure member being configured so that, when in said handle received position and the user's hand is in said utensil manipulating position, the second handle end rests on the user's hand generally between his thumb and index finger.

4. The manipulatable utensil figure of claim 2 including, said figure member being configured so that, when in said handle received position and the user's hand is in said utensil manipulating position, the second handle end is generally in the palm of the user's hand.

5. The manipulatable utensil figure of claim 1 including, said figure member being adapted so that, when in said handle received position, the second handle end is disposed within said hand grip portion.

6. The manipulatable utensil figure of claim 1 including, said figure head portion, when in said handle received position, being spaced above and from the handle.

7. The manipulatable utensil figure of claim 1 including, said figure head portion being configured to represent the forward head portion of an inanimate object.

8. The manipulatable utensil figure of claim 7 including, said figure member including a figure body portion attached to said figure head portion and configured to represent the body of said inanimate object.

9. The manipulatable utensil figure of claim 8 including, said figure member being configured to depict said inanimate object as resting on top of the handle when said figure member is in said handle received position.

10. The manipulatable utensil figure of claim 1 including, said figure head portion being configured to represent the head of an animal.

11. The manipulatable utensil figure of claim 10 including, said figure member including an animal body portion of said animal connected to said figure head portion, and an animal leg portion of said animal connected to said animal body portion.

12. The manipulatable utensil figure of claim 11 including, said animal leg portion having its outer end disposed generally above the handle when said figure member is in said handle received position.

13. The manipulatable utensil figure of claim 11 including, said figure member being configured so that said animal is depicted as sitting on the handle when said figure head is in said handle received position.

14. The manipulatable utensil figure of claim 11 including, said figure member being configured so that said animal is depicted as standing on the handle when said figure head is in said handle received position.

15. The manipulatable utensil figure of claim 10 including, said figure portion including a mouth of said animal having an upper jaw and a lower jaw, and said finger receiving channel extending above said upper jaw when said figure member is in said handle received position so that by movement of the index finger of the user whose hand is in said utensil manipulating position said upper jaw can be caused to move relative to said lower jaw.

16. The manipulatable utensil figure of claim 1 including, said figure member being generally hollow, and including a flexible sleeve therein communicable with said figure face portion for defining said finger receiving channel.

17. The manipulatable utensil figure of claim 1 including, a noise producing device supported by said figure member and positioned and adapted to be activated so as to produce a noise by the movement of the user's hand when in said utensil manipulating position.

18. The manipulatable utensil figure of claim 17 including, said noise producing device being a squeaker and said noise being a squeak.

19. The manipulatable utensil figure of claim 17 including, said noise producing device being positioned in said hand grip portion.

20. The manipulatable utensil figure of claim 17 including, said noise producing device being positioned in said figure face portion.

21. The manipulatable utensil figure of claim 20 including, said noise producing device being positioned adjacent said finger receiving channel so as to be actuated by the user's index finger of the user's hand when in said utensil manipulating position.

22. The manipulatable utensil figure of claim 17 including, said figure face portion representing a familiar object and said noise being the noise which said familiar object can make.

23. The manipulatable utensil figure of claim 1 including, said figure face portion being formed of a flexible material which is about one-sixteenth of an inch thick.

24. The manipulatable utensil figure of claim 1 including, said finger receiving channel, when said figure member is in said handle received position, being disposed generally parallel to the handle.

25. The manipulatable utensil figure of claim 1 including, said figure member being affixed to the handle in said handle received position so that the handle cannot move in or relative to said handle receiving opening.

26. The manipulatable utensil figure of claim 25 including, said figure member being integrally formed with the utensil, so as to be permanently affixed in said handle received position.

27. The manipulatable utensil figure of claim 1 including, said figure face portion being integrally formed with said hand grip portion.

28. The manipulatable utensil figure of claim 1 including, said figure member, when in said handle received position, being positioned between and spaced from the first and second handle ends.

29. The manipulatable utensil figure of claim 1 including, said finger receiving channel, when said figure member is in said handle received position, angling up and away from the second handle end.

30. The manipulatable utensil figure of claim 1 including, said figure member, when in said handle received position, being restrained by said handle receiving opening against free rotation about the handle.

31. The manipulatable utensil figure of claim 1 including, said handle receiving opening being configured so that said figure member can slide onto the first handle end generally freely along the handle towards the second handle end to said handle received position.

32. The manipulatable utensil figure of claim 1 including, said figure head, when in said handle received position, being adapted so that the user's hand, when in said utensil manipulating position, can effectively manipulate the utensil head for the intended purpose of the utensil.

33. The manipulatable utensil figure of claim 1 including, said finger receiving channel being configured to receive the index finger of the user whose hand is in said utensil manipulating position up to a location on his index finger between the second and third knuckles thereof.

34. The manipulatable utensil figure of claim 1 including, said hand grip portion being generally cylindrical and having its longitudinal axis disposed generally perpendicular to the longitudinal axis of the handle, when said figure head is in said handle received position.

* * * * *